(12) United States Patent
Richardson

(10) Patent No.: US 11,864,479 B2
(45) Date of Patent: Jan. 9, 2024

(54) MULTIPURPOSE DRAIN TOOL

(71) Applicant: Bryan Deane Richardson, Jensen Beach, FL (US)

(72) Inventor: Bryan Deane Richardson, Jensen Beach, FL (US)

(*) Notice: Subject to any disclaimer, the term of this patent is extended or adjusted under 35 U.S.C. 154(b) by 167 days.

(21) Appl. No.: 17/446,743

(22) Filed: Sep. 2, 2021

(65) Prior Publication Data
US 2023/0061975 A1    Mar. 2, 2023

(51) Int. Cl.
*A01B 1/02*     (2006.01)
*B08B 9/027*    (2006.01)

(52) U.S. Cl.
CPC .............. *A01B 1/022* (2013.01); *B08B 9/027* (2013.01)

(58) Field of Classification Search
CPC ....... A01B 1/022; A01B 1/20; E04D 13/0765; E04F 3/02
USPC .......................... 294/51, 24; 15/236.04; 7/116
See application file for complete search history.

(56) References Cited

U.S. PATENT DOCUMENTS

| | | | |
|---|---|---|---|
| 474,697 A * | 5/1892 | Shimer | |
| 576,756 A * | 2/1897 | Cole | |
| 1,146,609 A | 7/1915 | Anderson | |
| 1,253,472 A * | 1/1918 | Nelson ....................... B61J 3/10 |
| | | | 294/51 |
| 1,369,262 A | 2/1921 | Olsen | |
| 1,795,991 A | 3/1931 | Barwick | |
| 2,701,379 A * | 2/1955 | Balistreri ................. B25G 1/00 |
| | | | 473/294 |
| 3,782,770 A | 1/1974 | Lee | |
| 3,858,267 A * | 1/1975 | Swannie ............. E04D 13/0765 |
| | | | 15/144.1 |
| 4,549,611 A * | 10/1985 | Mills ........................ A01B 1/20 |
| | | | D8/7 |
| 5,348,360 A * | 9/1994 | Mencarelli ............... B25G 1/10 |
| | | | 74/551.9 |
| 5,507,051 A * | 4/1996 | Mazon .................... A01B 1/022 |
| | | | 7/104 |
| 5,669,649 A | 9/1997 | Metcalf | |
| 5,799,996 A * | 9/1998 | Fredrickson ............ A01B 1/20 |
| | | | 294/51 |
| 6,145,899 A | 11/2000 | Kelemen | |
| 6,460,911 B1 | 10/2002 | Engelsiepen | |
| 7,347,468 B1 | 3/2008 | Tidcomb | |
| 8,256,809 B2 | 9/2012 | Coutu | |
| 10,117,371 B2 | 11/2018 | Peterson | |
| 10,132,048 B1 | 11/2018 | Davis | |
| 10,660,252 B2 | 5/2020 | Akhter | |
| 2011/0037281 A1 | 2/2011 | Cox | |
| 2012/0098282 A1* | 4/2012 | Langan .................... B25G 3/30 |
| | | | 7/167 |

(Continued)

*Primary Examiner* — Dean J Kramer
(74) *Attorney, Agent, or Firm* — Squire Patent Consulting & IP Law LLC; Brendan E. Squire

(57) ABSTRACT

A multipurpose drain tool including a drain shovel "DROVEL™" and pry bar. The multipurpose drain tool includes a drain tool shaft, a proximal pry bar, and a distal drain shovel. The drain tool shaft carries at least one rubber hand grip, a proximal end cap, and a distal end cap. The pry bar is mounted to and extends outwardly from the proximal end cap. The drain shovel is mounted to and extends distally from the distal end cap. The multipurpose drain tool of the present invention offers a solution to the problem of clearing subsurface drains to restore drain functionality.

7 Claims, 3 Drawing Sheets

(56) References Cited

U.S. PATENT DOCUMENTS

| | | |
|---|---|---|
| 2015/0264853 A1 | 9/2015 | Anthony et al. |
| 2015/0319908 A1 | 11/2015 | Kuss et al. |
| 2017/0280612 A1 | 10/2017 | Teutsch |
| 2018/0116091 A1 | 5/2018 | Cacela |
| 2018/0153083 A1 | 6/2018 | Aoun |
| 2021/0235606 A1* | 8/2021 | Hyduke ................ A01B 1/022 |

* cited by examiner

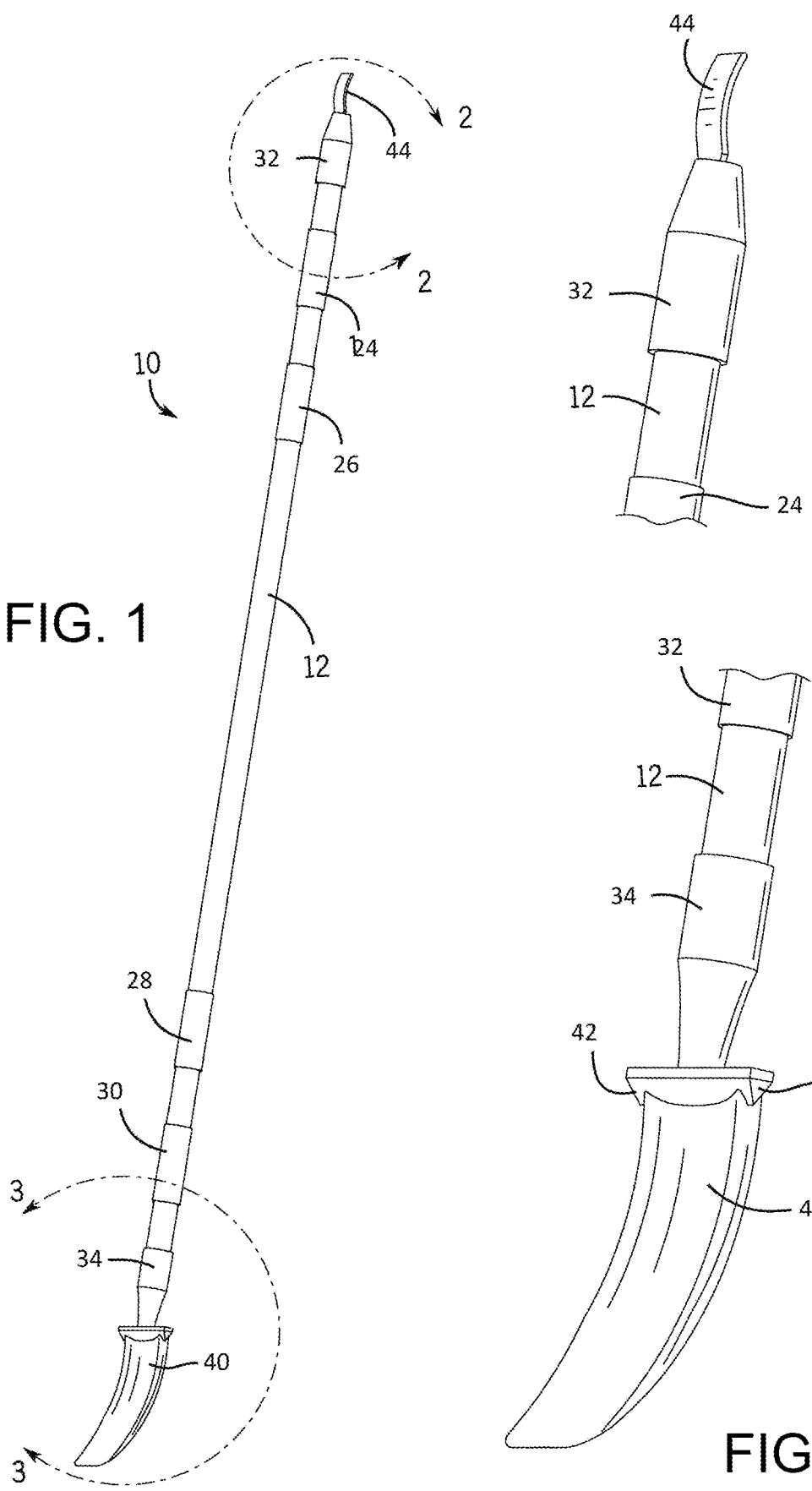

MULTIPURPOSE DRAIN TOOL

BACKGROUND OF THE INVENTION

The present invention relates to shovels, and more particularly, to a multipurpose drain tool including a drain shovel (DROVEL™) and pry bar.

Sedimentary particles used to finish and level the playing surface of clay tennis courts and tennis courts with HAR-TRU® tennis court material, migrate and clog subsurface drains. This renders the function of such drains useless during periods of sustained precipitation.

Shovels currently available and commonly used to effect the task of removing these particles fall woefully short in practical application and require awkward and redundant efforts. Existing shovels do effectively accommodate subsurface drains, such as, for example without limitation, subsurface drains associated with tennis courts. Existing shovels are not manufactured to reflect the unique shape depth and contour of these drains.

A need exists for a shovel tool capable of efficiently and effectively clearing subsurface drains to restore drain functionality more rapidly with significantly less effort.

SUMMARY OF THE INVENTION

Advantageously, in one aspect, the present invention offers a solution to the problem of clearing subsurface drains to restore drain functionality. The present invention provides a multipurpose drain tool including a drain shovel (DROVEL™) and pry bar. The present invention further provides a multipurpose tennis court drain tool including a drain shovel (DROVEL™) and pry bar. The multipurpose drain tool of the present invention offers a solution to the problem of clearing subsurface drains to restore drain functionality.

In one aspect, the present invention provides a multipurpose drain tool having a proximal end a distal end, and an intermediate portion. The multipurpose drain tool includes a drain tool shaft, a proximal pry bar, and a distal drain shovel. The drain tool shaft carries at least one rubber hand grip, a proximal end cap, and a distal end cap. The pry bar is mounted to and extends outwardly from the proximal end cap. The drain shovel is mounted to and extends distally from the distal end cap.

In one aspect the present invention provides a multipurpose drain tool capable of use to solve the problem of clogging of subsurface drains.

In a still further aspect, the multipurpose drain tool of the present invention is constructed and arranged to match the shape, depth, and contour of the subsurface drain. The multipurpose drain tool is capable of use to efficiently clear sedimentary debris that renders the function of the drain useless, and to permit drainage. The unique shape and contour of the multipurpose drain tool enables more complete and efficient clearing of the drains, restoring functionality of the drain more rapidly with significantly less effort.

In another aspect the present invention provides a multipurpose drain tool to remove sedimentary particles used to finish and level the playing surface of clay tennis courts and tennis courts with HAR-TRU® tennis court surface material, from subsurface drains to maintain the function of the drains and restore function of the drains during periods of sustained precipitation.

These and other features, aspects and advantages of the present invention will become better understood with reference to the following drawings, description and claims.

BRIEF DESCRIPTION OF THE DRAWINGS

The preferred embodiment of the claimed subject matter will hereinafter be described in conjunction with the appended drawings provided to illustrate and not to limit the scope of the claimed subject matter, where like designations denote like elements, and in which:

FIG. 1 is a perspective view of a multipurpose drain tool in accordance with an exemplary embodiment of the present invention;

FIG. 2 is a detail perspective view of a proximal pry bar located at the proximal end of the multipurpose drain tool of the present invention;

FIG. 3 is a detail perspective view of the distal shovel located at the distal end of the multipurpose drain tool of the present invention;

It is to be understood that like reference numerals refer to like parts throughout the several views of the drawings.

DETAILED DESCRIPTION OF THE INVENTION

Figure 4:
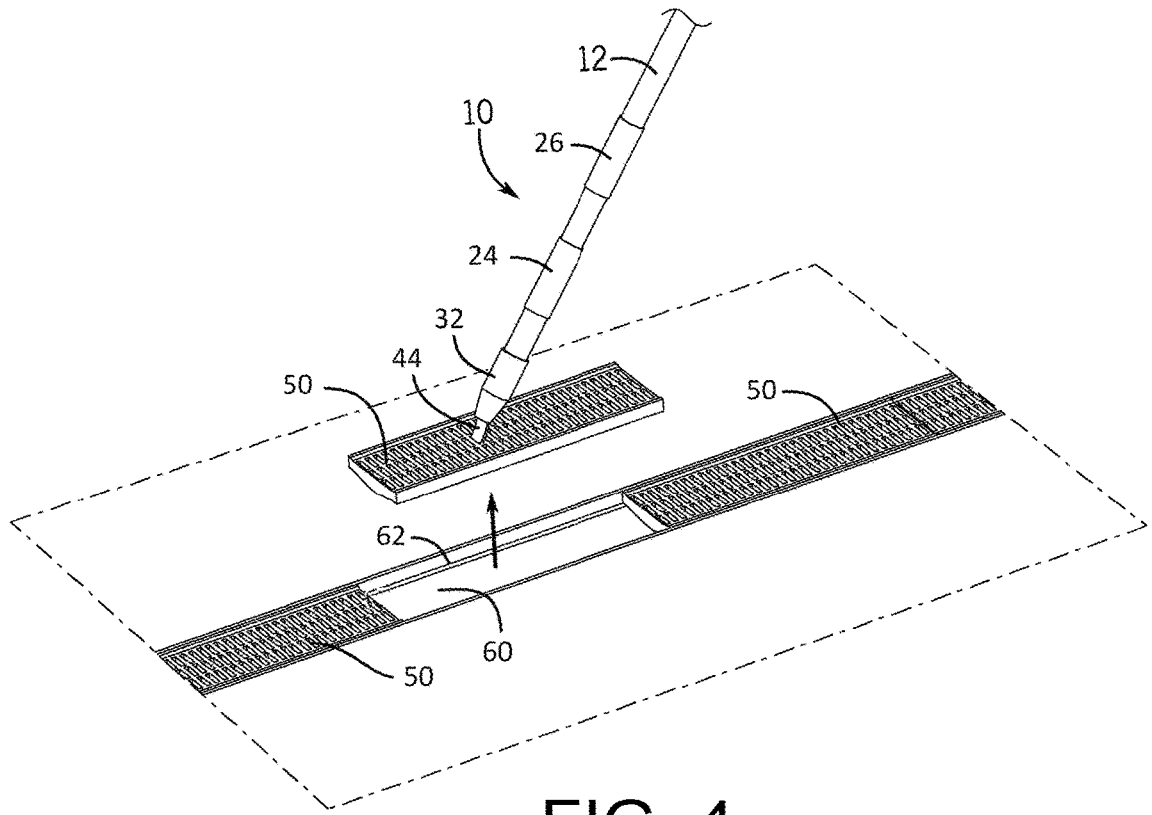
FIG. 4 is a perspective view of the proximal pry bar of the multipurpose drain tool of the present invention in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, one embodiment of the present invention provides a multipurpose drain tool. The multipurpose drain tool is constructed and arranged for use in cleaning subsurface drains to restore their functionality.

In an exemplary embodiment, the multipurpose drain tool comprises a drain tool shaft having a proximal end, a distal end, and a distal shovel carried by the distal end of the drain tool shaft. The distal shovel has a shape which conforms to an interior surface of a subsurface drain. In some embodiments, the subsurface drain is a tennis court drain. The shape which conforms to the interior surface of the subsurface drain enables a user to easily remove material from the drain.

In one embodiment, the multipurpose drain tool includes a proximal pry bar carried at the proximal end of the drain tool shaft.

In an exemplary embodiment, the multipurpose drain tool comprises a drain tool shaft having a drain tool shaft proximal portion, a drain tool shaft distal portion, a drain tool shaft proximal end, a drain tool shaft distal end, and a drain tool shaft intermediate portion. The multipurpose drain tool further comprises at least one proximal rubber hand grip located at the proximal portion of the drain tool shaft and carried thereby, and at least one distal rubber hand grip located at the distal portion of the drain tool shaft and carried thereby. The multipurpose drain tool includes a proximal end cap located at the first proximal end of the drain tool shaft, and a distal end cap located at the second distal end of the drain tool shaft. The multipurpose drain tool includes a proximal pry bar located at the first proximal end of the drain tool shaft, the proximal pry bar being mounted to the proximal end cap and extending outwardly therefrom. In addition, the multipurpose drain tool includes a distal shovel located at the second distal end of the drain tool shaft, the distal shovel being mounted to and extending distally from the distal end cap.

In some embodiments, the at least one proximal handgrip comprises a first proximal rubber hand grip and a second proximal rubber hand grip, the first proximal rubber hand grip and second proximal rubber hand grip being spaced a predetermined distance apart. In some embodiments, the at least one distal handgrip comprises a first distal rubber hand grip and a second distal rubber hand grip, the first distal rubber hand grip and second distal rubber hand grip being spaced a predetermined distance apart. The proximal rubber hand grips are spaced a predetermined distance apart, and the distal rubber hand grips are spaced a distance apart, to accommodate a comfortable grip of the user when using the distal shovel.

The multipurpose tool is also constructed and arranged to be ergonomic and comfortable to use. The hand grips are positioned to permit the user to comfortably grip the tool whether using the proximal end or the distal end. The proximal pry bar and distal mini shovel are also mounted to the tool shaft to maximize efficient and comfortable use of the tool. The multipurpose tool may be beneficially used to accomplish physical tasks with less effort and more efficiency all while maintaining better body posture.

In one aspect, the multipurpose drain tool solves the problem of cleaning subsurface drains of sedimentary particles used to finish and level the playing surface of clay tennis courts, and tennis courts with HAR-TRU® tennis court surface material. These sedimentary particles migrate and clog subsurface drains, rendering the function of drains useless during periods of sustained precipitation.

The multipurpose drain tool of the present invention provides an unprecedented solution. Shovels currently available and commonly used to effect this task fall woefully short in practical application and require awkward and redundant efforts.

The multipurpose drain tool of the present invention is constructed and arranged to match and accommodate the shape, depth, and contour of the drain to efficiently clear sedimentary debris that impedes drainage and renders the function of the drain useless. The unprecedented multipurpose drain tool has a unique shape, contour and depth constructed and arranged to fit into a subsurface drain to allow more complete and efficient clearing of the drains, restoring functionality of the drain more rapidly with significantly less effort.

The multipurpose drain tool of the present invention differs from and distinguishes over current solutions. No other tool is specifically made to accomplish this task and simplify this common maintenance task to restore functionality of a subsurface drain. Conventional shovels are not manufactured to reflect the shape depth and contour of the drains which have a unique shape depth and contour. The multipurpose drain of the present invention matches the shape, depth, and contour of the drain to efficiently clear sedimentary debris.

The multipurpose drain tool of the present invention comprises a distal shovel. The distal shovel may be a mini shovel constructed and arranged to fit a subsurface drain of specific shape, depth, and contour. The subsurface drain may be a tennis court drain. Also, the multipurpose drain tool of the present invention may have applicability in multiple uses. The multipurpose drain tool may be used in other refined application specific landscape and irrigation areas and settings.

In use, the distal shovel fits the dimensions of the subsurface drain. The multipurpose tool may be beneficially used to clear sedimentary runoff that collects and clogs subsurface drains. The position of the hand grips permits the user to comfortably hold and use the multipurpose drain tool and maintain body posture to accomplish physical tasks with less effort and more efficiency.

The multipurpose drain tool of the present invention may have any suitable dimensions. The multipurpose drain tool distal shovel may be of any suitable length, to accommodate a subsurface drain of any depth. The width of the distal shovel may be any suitable width. The width of the distal shovel may vary between about 3" to about 12". In some embodiments the multipurpose drain tool may have a distal shovel having a shovel width of up to about 5", to accommodate a subsurface drain that is about 5" wide. For example without limitation, a subsurface tennis court drain may have a width of about 5". In some embodiments, the distal shovel width may be about 3". In other embodiments the distal shovel width may be about 8". In other embodiments the distal shovel may have a width of about 12".

The multipurpose drain tool of the present invention and the components thereof may be made of any suitable materials and may be fabricated by any suitable fabrication method. In some embodiments, the drain tool shaft may be made of carbon fiber. The distal mini shovel and the proximal pry bar may be made of any suitable material, such as, for example without limitation, metal, plastic, carbon, or combinations thereof. The hand grips may be made of a pliable material such as rubber, silicone, or combinations thereof. The end caps may be made of any suitable material. To make the multipurpose drain tool, one may create, shape, and hone a mini shovel to reflect and accommodate the shape, depth, and contour of the subsurface drain itself to promote efficient accomplishment of task at hand. The positioning of the mini shovel on the tool shaft also contributes to the ease of use. In some embodiments, the multipurpose tool has a proximal pry bar constructed and arranged for use to remove sections of plastic grates that cover drains in order to access and clear the drain using the drain shovel. However, in other embodiments, the mini shovel may be provided with a feature capable of use to remove the sections of plastic drain cover grates to access the drain for cleaning.

In some embodiments, the multipurpose drain tool of the present invention, is constructed and arranged for use in cleaning any suitable subsurface drain. In some embodiments, the multipurpose drain tool may be used to clear tennis court drains that fill with sedimentary material from the tennis court surface. The tennis courts require routine maintenance by personnel to physically remove drain cover grating on top of the drain to access and shovel out the material which has collected in the drain. In some situations, sedimentary material may collect in the drain to the point where the drain ceases functioning and becomes useless.

Referring now to the Figures, FIG. 1 provides a perspective view of a multipurpose drain tool, shown generally at 10. The multipurpose drain tool 10, comprises a drain tool shaft 12 having a proximal end, a distal end, and a distal shovel 40 carried by the distal end of the drain tool shaft 12. The distal shovel 40 has a shape which conforms to an interior surface of a subsurface drain. In some embodiments, the subsurface drain is a tennis court drain. The shape which conforms to the interior surface of the subsurface drain enables a user to easily remove material from the drain.

In one embodiment, the multipurpose drain tool includes a proximal pry bar 44 carried at the proximal end of the drain tool shaft 12.

In an exemplary embodiment, the multipurpose drain tool comprises a drain tool shaft 12 having a drain tool shaft proximal portion, a drain tool shaft distal portion, a first proximal end, a second distal end, and an intermediate portion. The multipurpose drain tool further comprises at least one proximal rubber hand grip and at least one distal rubber hand grip. In some embodiments, proximal hand grips 24, 26 are located at the proximal portion of the drain tool shaft 12 and carried thereby, and distal rubber hand grips 28,30 are located at the distal portion of the drain tool shaft 12 and carried thereby. The proximal hand grips 24,26 are spaced a predetermined distance apart, and the distal hand grips 28,30 are spaced a predetermined distance apart, to accommodate a comfortable grip of the user when using the multipurpose drain tool 10.

The multipurpose drain tool includes a proximal end cap 32 located at the first proximal end of the drain tool shaft, and a distal end cap 34 located at the second distal end of the drain tool shaft.

As seen at FIG. 1 and with particular reference to the detail perspective view of FIG. 2, the multipurpose drain tool 10 includes a proximal pry bar 44 located at the first proximal end of the drain tool shaft 12. The proximal pry bar 44 is mounted to the proximal end cap 32 and extends outwardly therefrom. The proximal pry bar has a curved shaped ending in a pry bar end.

As seen at FIG. 1 and with particular reference to the detail perspective view of FIG. 3, the multipurpose drain tool includes a distal shovel 40 located at the second distal end of the drain tool shaft 12, the distal shovel 40 being mounted to and extending distally from the distal end cap 34. The distal shovel 40 has a curved conformation constructed and arranged for scooping and shoveling materials and debris. The distal shovel 40 has an upper portion including upper shovel shoulders 42.

Referring now to FIGS. 4-7, the multipurpose drain tool 10 is shown in use.

FIG. 4 provides a perspective view of the proximal pry bar 44 of the multipurpose drain tool 10 in use. The proximal pry bar 44 may be used to remove a section of a cover grate 50 that covers a drain gutter 60 in order to access the drain gutter 60.

Figure 5:
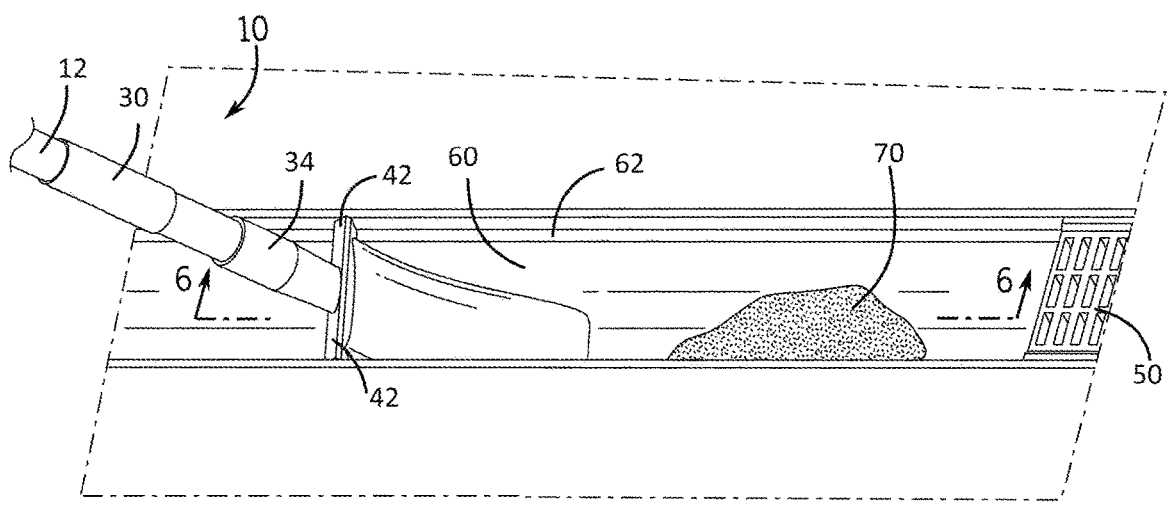
FIG. 5 is a top perspective view of the distal shovel of the multipurpose drain tool of the present invention in use.
Figure 6:
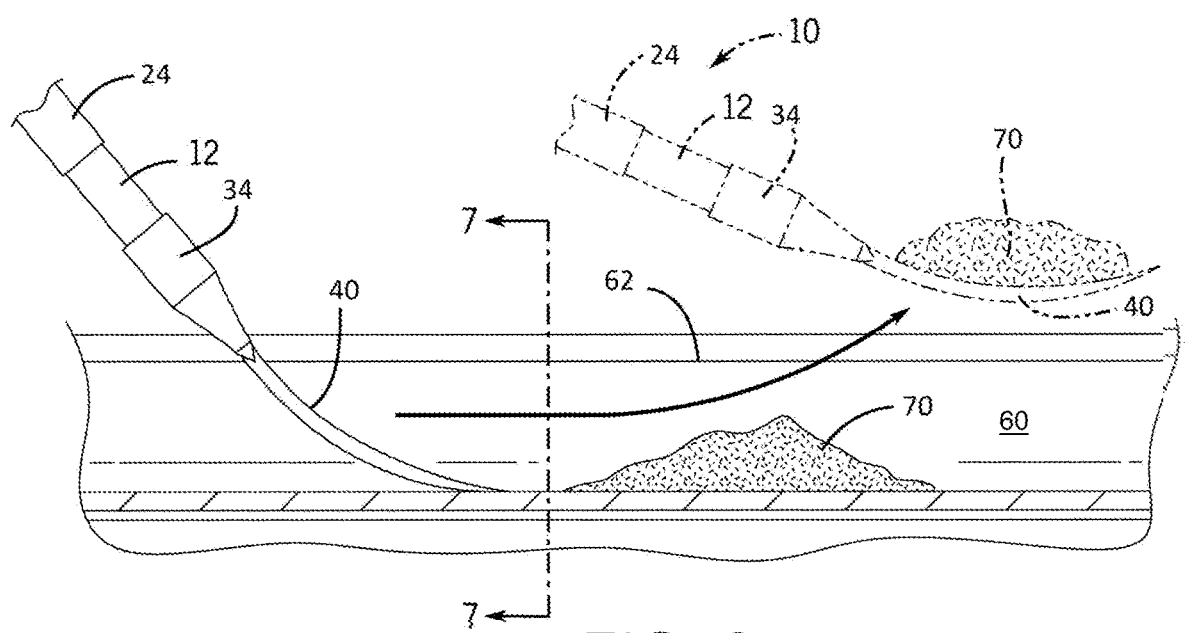
FIG. 6 is a cross-sectional view taken on line 6-6 of FIG. 5 showing further detail.

FIG. 5 provides a top perspective view of the distal shovel of the multipurpose drain tool of the present invention in use, and FIG. 6 provides further detail in a cross-sectional view taken along line 6-6 of FIG. 5. As seen at FIGS. 5-6, the distal shovel 40 may be used to clear the drain gutter 60 of debris 70.

Figure 7:
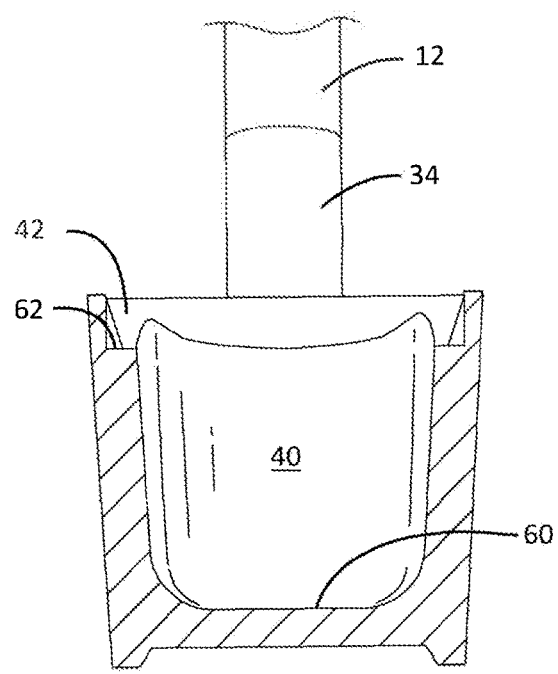
FIG. 7 is a cross-sectional view taken on line 7-7 of FIG. 6 showing further detail.

As shown at FIG. 5, and with particular reference to FIG. 7, a cross-sectional view taken along line 7-7 of FIG. 6, the distal shovel 40 and upper shovel shoulders 42 of the distal shovel 40 are shaped to accommodate the drain gutter shoulders 62 of the drain gutter 60. FIG. 7 provides a front view of the distal shovel 40 in use in the drain gutter. It is seen that the distal shovel 40 fits the shape, depth, and contour of the drain gutter 60 to efficiently clear debris 70 such as sedimentary runoff that may collect and clog the drain.

In some embodiments, a multipurpose drain tool for use to clean a drain gutter having a width of between about 5"-6", may have a distal shovel with a width of up to about 5".

It should be understood, of course, that the foregoing relates to exemplary embodiments of the invention and that modifications, variations and changes in detail may be made without departing from the spirit and scope of the invention as set forth in the following claims.

What is claimed is:

1. A multipurpose drain tool comprising:
    a drain tool shaft having a drain tool shaft proximal portion, a drain tool shaft distal portion, a drain tool shaft proximal end, a drain tool shaft distal end, and a drain tool shaft intermediate portion;
    at least one rubber hand grip located on drain tool shaft and carried thereby, the at least one rubber hand grip comprising a first proximal rubber hand grip and a second proximal rubber hand grip spaced a predetermined distance apart, and a first distal rubber hand grip and a second distal rubber hand grip spaced a predetermined distance apart;
    a proximal end cap located at the drain tool shaft proximal end;
    a distal end cap located at the drain tool shaft distal end;
    a proximal pry bar located at the drain tool shaft proximal end, the proximal pry bar being mounted to and extending outwardly from the proximal end cap; and
    a distal shovel located at the drain tool shaft distal end, the distal shovel being mounted to and extending distally from the distal end cap, the distal shovel having a width corresponding to an interior width of an interior surface of a subsurface drain trough having a drain trough floor, a first drain trough side wall and a second drain trough side wall, the distal shovel being constructed and arranged for insertion into the subsurface drain trough to contact the drain trough floor, the first drain trough sidewall and the second drain trough sidewall.

2. The multipurpose drain tool of claim 1 wherein the subsurface drain is a tennis court drain for a clay tennis court or tennis court with HAR-TRU® tennis court surface material.

3. The multipurpose drain tool of claim 1 wherein the distal shovel has a distal shovel width between about 3" to about 12".

4. The multipurpose drain tool of claim 3 wherein the distal shovel has a width of up to about 5".

5. The multipurpose drain tool of claim 1 wherein the drain tool shaft is made of carbon fiber.

6. A multipurpose drain tool for cleaning a subsurface tennis court drain, the multipurpose drain tool comprising:
   a carbon fiber drain tool shaft having a drain tool shaft proximal portion, a drain tool shaft distal portion, a first proximal end, a second distal end, and an intermediate portion;
   a first proximal rubber hand grip and a second proximal rubber hand grip located on the drain tool shaft proximal portion and carried thereby, the first proximal rubber hand grip and second proximal hand grip being spaced a predetermined distance apart;
   a first distal rubber hand grip and a second distal rubber hand grip located on the drain tool shaft distal portion and carried thereby, the first distal rubber hand grip and second distal rubber hand grip being spaced a predetermined distance apart;
   a proximal end cap located at the first proximal end of the drain tool shaft;
   a distal end cap located at the second distal end of the drain tool shaft;
   a proximal pry bar located at the first proximal end of the drain tool shaft, the proximal pry bar being mounted to the proximal end cap and extending outwardly therefrom;
   a distal shovel located at the second distal end of the drain tool shaft, the distal shovel being mounted to and extending distally from the distal end cap, the distal shovel having a width which corresponds to an interior width of an interior surface of a subsurface drain trough having a drain trough floor, a first drain trough side wall and a second drain trough side wall, the distal shovel being constructed and arranged for insertion into the subsurface drain trough of the subsurface tennis court drain to contact the drain trough floor, the first drain trough side wall and the second drain trough side wall.

7. A method for cleaning a subsurface tennis court drain for one or more of a clay tennis court or a HAR-Tru tennis court having an interior drain trough containing a quantity of unwanted debris and particulate matter therein, the method comprising the steps of:
   providing a multipurpose drain tool as in claim 6;
   using the proximal end of the multipurpose drain tool to remove at least a portion of a drain grate cover by inserting the proximal pry bar into the at least a portion of the drain grate cover and prying the at least a portion of the drain grate cover upward to uncover a portion of the interior drain trough underlying the at least a portion of the drain grate cover previously removed;
   using the distal end of the multipurpose drain tool to remove at least a portion of the unwanted debris and particulate matter from the interior drain trough by using the distal shovel to scoop and remove the at least a portion of the quantity of unwanted debris and particulate matter;
   disposing of the quantity of unwanted debris and particulate matter removed from the drain trough; and
   replacing the at least a portion of the drain grate cover.

\* \* \* \* \*